United States Patent [19]

Klimowicz et al.

[11] 4,265,272

[45] May 5, 1981

[54] TRANSIENT START-UP ELIMINATOR FOR PRESSURE PILOTED VALVE

[75] Inventors: Michael A. Klimowicz, Kalamazoo; Charles R. Cornell, Battle Creek, both of Mich.

[73] Assignee: Eaton Corporation, Cleveland, Ohio

[21] Appl. No.: 80,963

[22] Filed: Oct. 1, 1979

[51] Int. Cl.³ .................. F15B 13/042; F16K 31/40; F16K 31/383

[52] U.S. Cl. ............................ 137/625.62; 251/31; 251/126

[58] Field of Search .................. 137/625.61, 625.62; 251/31, 126

[56] References Cited

U.S. PATENT DOCUMENTS

| | | |
|---|---|---|
| 3,035,593 | 5/1962 | Page . |
| 3,646,762 | 3/1972 | Hawk et al. . |
| 3,791,619 | 2/1974 | Pett ............................... 251/30 X |
| 3,857,541 | 12/1974 | Clark .......................... 137/625.62 X |
| 3,934,812 | 1/1976 | Pett ............................... 251/30 X |

*Primary Examiner*—Gerald A. Michalsky
*Attorney, Agent, or Firm*—R. J. McCloskey; J. Yakimow; M. L. Union

[57] ABSTRACT

A control valve assembly (10) is provided for controlling a hydrostatic transmission including a fluid pump having a variable swashplate, a source of control fluid under pressure, and a servo system responsive to the control fluid for varying the swashplate of the fluid pump. The control valve includes a valve body (12), first (26) and second (28) fluid chambers disposed in the valve body, a first fluid passageway (30) disposed in the valve body for directing pressurized control fluid to the first and second fluid chambers and a valve member (16) located in the valve body for controlling the flow of control fluid to the servo system. The pressurized fluid in the first fluid chamber acts on the valve member to bias the valve member in a first direction and the pressurized fluid in the second chamber acts on the valve member to bias the valve member in the second direction opposite the first direction. A viscosity sensitive restriction (64) is disposed in the first fluid passageway and control fluid is directed therethrough to the first and second fluid chambers. The viscosity sensitive restriction maintains substantially equal pressures in the first and second chambers upon initial pressurization thereof. The fluid flow through the viscosity sensitive restriction is laminar and has a Reynolds number of less than 2,000.

27 Claims, 1 Drawing Figure

U.S. Patent
May 5, 1981
4,265,272
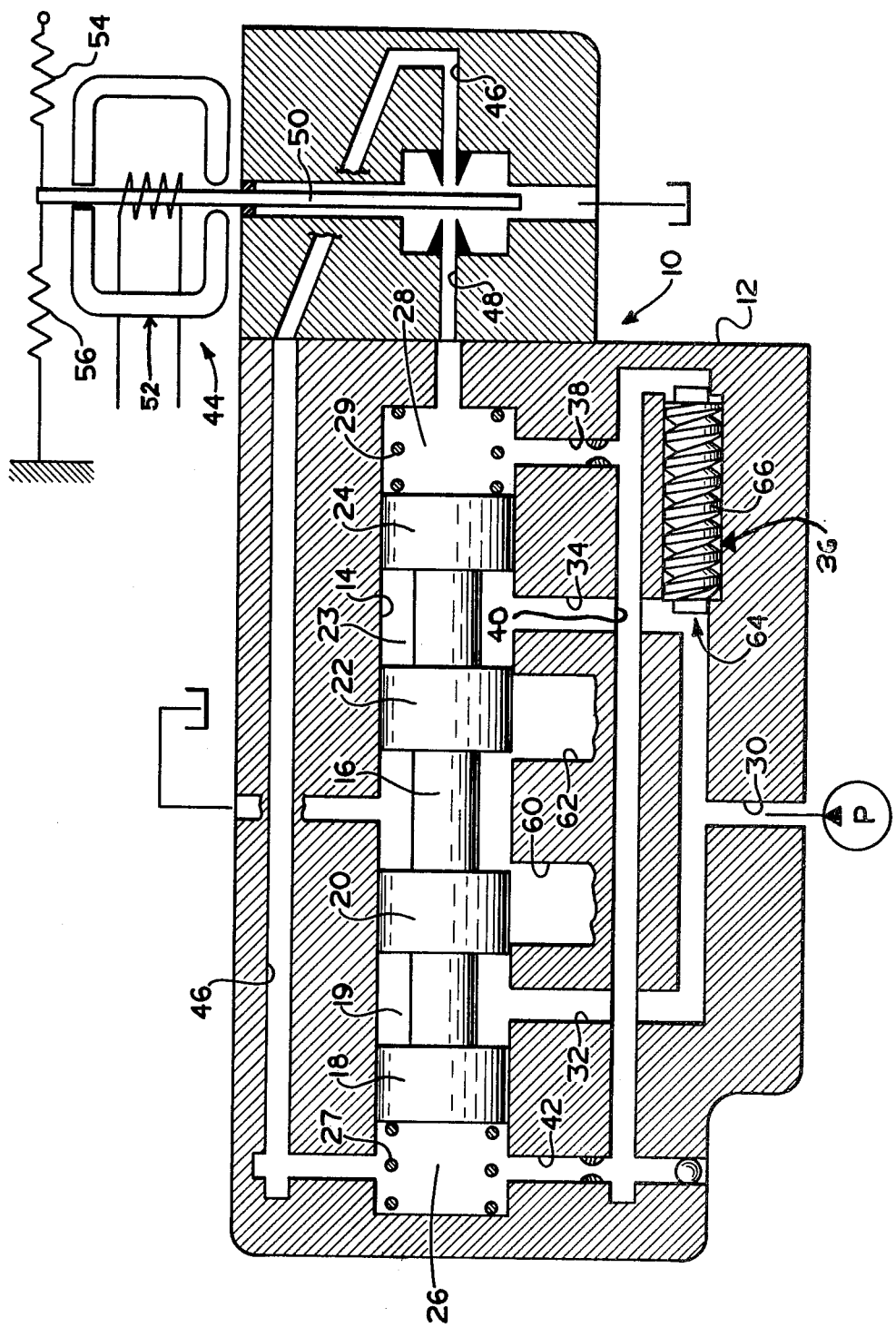

TRANSIENT START-UP ELIMINATOR FOR PRESSURE PILOTED VALVE

BACKGROUND OF THE INVENTION

1. Field of the Invention

The present invention relates to a control valve having first and second fluid chambers and a valve member which is biased in opposite directions by the fluid pressure in the first and second chambers. A viscosity sensitive restriction is provided in the fluid passageway which directs fluid flow to the first and second chambers. The viscosity sensitive restriction maintains substantially equal pressure in the first and second chambers upon initial pressurization thereof to prevent movement of the valve member from a neutral position upon initial pressurization of the first and second chambers.

2. Background of the Invention

Control valves for hydrostatic transmissions are well known in the art. Such valves are disclosed in the Hawk U.S. Pat. No. 3,646,762, the Knapp et al U.S. Pat. No. 3,972,189 and the Cornell et al U.S. Pat. No. 3,924,410. In the known control valves, it is generally required that physical symmetry of the hydraulic runs from the spool ends to the flapper and from the spool ends to the inlet passageway be present for equal volume and equal transient flow. It is also normal to eliminate dead end holes and pockets for air to collect to avoid a compressible fluid on either side of the spool valve. Adhering to these design criteria results in additional expense to the cost of the control valve.

In the prior art physical symmetry of the hydraulic runs was necessary to maintain the valve spool in its neutral position upon an initial pressurization where a low viscosity control fluid is utilized. If symmetry were not maintained, the pressures in the fluid chambers acting on the spool would not be balanced upon initial pressurization thereof and the spool would displace to a point where the servo means would be activated to move the swashplate from the initial neutral position due to transients in the fluid pressure acting on the spool.

The present invention attempts to solve the problems of the prior art while eliminating the need for symmetry in the hydraulic runs. A viscosity sensitive restriction is provided in the fluid passageway between the pressurized supply of control fluid and the fluid chambers which act on the spool valve. The viscosity sensitive restriction allows the transient startup pressures to be easily controlled. During a high viscosity, cold start, the viscosity sensitive restriction will allow the pressurized supply of control fluid flowing to each of the fluid chambers to rise at a rate which will not allow the upstream orifices to reach flow saturation; therefore, control fluid flow into one side of the spool valve and one chamber may be greater than into the other side of the spool member while still maintaining equal pressures between the chambers. Thus, the viscosity sensitive restriction gives the valve the ability to compensate for different compressible volumes due to an imbalance in physical layout. The colder the temperature, and the higher the viscosity of the control fluid, the lower the flow saturation of the upstream orifices and the greater the pressure drop across the viscosity sensitive restriction.

SUMMARY OF THE INVENTION

The present invention relates to a control valve for controlling a hydrostatic transmission including a fluid pump having a variable swashplate, a source of control fluid under pressure and servo means responsive to the control fluid for varying the swashplate of the fluid pump. The control valve includes a valve body, first and second fluid chambers located in the valve body, a first fluid passageway means disposed in the valve body for directing pressurized control fluid to the first and second fluid chambers, and a valve member located in the valve body for controlling the flow of pressurized control fluid to the servo means. The pressurized fluid in the first chamber acts on the valve member to bias the valve member in a first direction and the pressurized fluid in the second chamber acts on the valve member to bias the valve member in a second direction opposite the first direction. A viscosity sensitive restriction is disposed in the first fluid passageway and the control fluid is directed therethrough to the first and second fluid chambers. The viscosity sensitive restriction maintains substantially equal pressures in the first and second chambers upon initial pressurization thereof.

The present invention further provides a new and improved control valve as set forth in the next preceeding paragraph wherein the viscosity sensitive restriction includes a threaded member disposed in the first passageway means defining a viscosity sensitive passageway through which the control fluid must pass. The fluid flow through the viscosity sensitive restriction is laminar and has a Reynolds number of less than 2,000.

Another provision of the present invention is to provide a new and improved control valve for controlling the flow of control fluid including a valve body, first and second fluid chambers disposed in the valve body, a first fluid passageway means disposed in the valve body for directing pressurized control fluid to the first and second chambers and a valve member for controlling the flow of pressurized control fluid from the valve body. The pressurized fluid in the first fluid chamber biases the valve member in a first direction and the pressurized fluid in the second fluid chamber biases the valve member in a second direction opposite the first direction. A viscosity sensitive restriction is provided in the first fluid passageway means and through which control fluid is directed to the first and second fluid chambers. The viscosity sensitive restriction maintains substantially equal pressures in the first and second chambers upon initial pressurization thereof.

Still another provision of the present invention is to provide a new and improved spool valve for controlling a flow of control fluid, including a valve body, a spool valve member having first and second lands thereon disposed in a bore in the valve body, a first fluid chamber defined by the first land and the bore, a second fluid chamber defined by the second land and the bore, first fluid passageway means disposed in the valve body for directing a pressurized control fluid to the first and second fluid chambers, and second fluid passageway means for directing the control fluid from the valve body. The spool valve member controls the fluid flow through the second fluid passageway means and has a neutral position for blocking the second fluid passageway means. The pressurized fluid in the first chamber biases the spool valve member in a first direction and the pressurized fluid in the second chamber biases the spool valve member in a second direction opposite the first direction. A viscosity sensitive restriction is disposed in the first fluid passageway means and fluid is directed therethrough to the first and second fluid chambers. The viscosity sensitive restriction maintains substantially equal pressures in the first and second fluid chambers upon initial pressurization of the first and second fluid chambers to prevent movement of the spool valve member from its neutral position.

DESCRIPTION OF THE DRAWINGS

FIG. 1 is a schematic illustration of a control valve for a hydrostatic transmission embodying the present invention.

DESCRIPTION OF THE PREFERRED EMBODIMENT

Referring to the FIGURE, the present invention discloses a spool valve 10. The valve 10 in its preferred embodiment is a control valve for controlling a hydrostatic transmission. The hydrostatic transmission, which is not illustrated, includes a prime mover, such as an engine, for driving a fluid pump having a variable swashplate, a source of control fluid under pressure, and servo means responsive to the control fluid for varying the angle of the swashplate in the fluid pump. The output of the fluid pump is connected to a fluid motor to drive the motor in accordance with a control signal. The schematic operation of a hydrostatic transmission is disclosed in U.S. Pat. Nos. 3,924,410 and 3,972,189, both of which are incorporated herein by reference.

In the general operation of a hydrostatic transmission the prime mover drives the fluid pump which displaces fluid therein to effect driving of the fluid motor. The angle of the swashplate in the pump is variable to vary the displacement of the pump and, hence, the output of the fluid motor. Servo means, usually in the form of a pair of servo pistons, is provided for controlling the angle of the swashplate and the displacement of the fluid pump. The servo means is responsive to a control valve which controls the flow of the pressurized control fluid, usually from a charge pump, to vary the displacement of the fluid pump in accordance with control signals directed to the control valve. The present invention is particularly related to the construction of a control valve for a hydrostatic transmission, although the valve is utilizable in embodiments other than a hydrostatic transmission to control a control fluid flow.

The control valve 10, as illustrated in FIG. 1, includes a valve body 12 having a longitudinal bore 14 disposed therein. A valve member 16, which in the preferred embodiment is a spool valve member, is disposed for movement in the bore 14 of the valve 10. The valve member 16 includes first, second, third and fourth lands thereon, respectively, 18, 20, 22 and 24. The land 18 cooperates with the bore 14 to define a first fluid chamber 26 disposed at one end of the valve member 16 and the land 24 cooperates with the bore 14 to define a second fluid chamber 28 disposed at the other end of the valve member 16. The fluid pressure in fluid chamber 26 acts on the valve member 16 to bias the valve member 16 in a first direction, toward the right as viewed in the FIGURE. The pressurized fluid in fluid chamber 28 acts on the valve member 16 to bias the valve members 16 in a second direction, opposite the first direction, or toward the left, as viewed in the FIGURE. Controlling the fluid pressure in chambers 26 and 28 controls the position of the spool valve member 16 in the bore 14.

Springs 27 and 29 are disposed in chambers 26 and 28 respectively to bias the valve member 16 toward its neutral position when there is no control fluid pressure differential acting on the valve member 16.

A fluid passageway 30 is provided for directing a source of pressurized control fluid from the hydrostatic transmission into the valve 10. The fluid passageway 30 preferably receives its pressurized control fluid from a charge pump, not illustrated, associated with the hydrostatic transmission. The fluid passageway 30 includes portions 32 and 34 which direct fluid flow to the bore 14 and a portion identified by the numerals 36, 38, 40 and 42 which directs the pressurized control fluid to the fluid chambers 26 and 28. The flow of control fluid through the inlet passageway 30 and through the portion 36, 38, 40 and 42 effects pressurization of the fluid chambers 26 and 28 to bias the valve member 16 in accordance with the fluid pressures established in chambers 26 and 28.

A well known control which is preferably a flapper valve 44 but which may be either of the control valves shown in U.S. Pat. Nos. 3,924,410 or 3,972,189 is provided for controlling the fluid pressure in fluid chambers 26 and 28 in accordance with a control signal which is directed to the control. The control signal as is well known is indicative of desired pump displacement and actuates flapper valve 44 to control spool valve 10 and thus control the servo piston means associated with the swashplate of the fluid pump.

A fluid passageway 46 is provided in the valve body 12 for directing pressurized control fluid from the fluid chamber 26 and a fluid passageway 48 is disposed in the valve body 12 for directing fluid flow from the fluid chamber 28. The flapper valve 44 is operable to open and close fluid passageways 48 and 46 to control the fluid flow therethrough and the pressure in chambers 26 and 28.

The flapper valve 44 includes a flapper 50 whose position is controlled by a torque motor 52. The torque motor is controlled by a standard control signal which positions the flapper 50 in a well known manner to control the fluid flow through passageways 46 and 48. The flapper valve 44 can be provided with a null-adjustment 54 and a mechanical feedback 56 which feeds back to the flapper valve 44 the sensed swashplate position. When the flapper 50 is in its position illustrated, there will be substantially equal fluid flow through the fluid passageways 46 and 48 and the valve member 16 will be positioned in its neutral position as is illustrated. Movement of the flapper 50 toward the right in the FIGURE in response to a control signal to the torque motor 52 will block passageway 46 and further open passageway 48. This will cause an increase in fluid pressure in chamber 26 and a decrease in fluid pressure in chamber 28. The increase in pressure in fluid chamber 26 and the decrease in pressure in fluid chamber 28 will cause the spool valve member 16 to move toward the right in the FIGURE. Movement of the flapper 50 toward the left in the FIGURE will block passageway 48 and further open passageway 46. This will effect an increase in pressure in chamber 28 and a decrease in pressure in chamber 26, resulting in movement of the spool valve member 16 toward the left.

Fluid passageways 60 and 62 are disposed in the valve body 12 for directing pressurized control fluid from the fluid passageways 32 and 34 and the bore 14 to the servo piston means of the hydrostatic transmission. Preferably, as is well known, the servo piston means, not illustrated, of the hydrostatic transmission includes at least a pair of servo pistons, one of which is actuatable to bias the swashplate of the pump in a first direction to increase pump displacement and one of which is actuatable to bias the swashplate of the pump in a second direction, opposite the first direction, to decrease the pump displacement. One of the fluid passageways 60, 62 will be connected to one of the servo piston means to effect increased pump displacement upon fluid flow therethrough and the other of the fluid passageways 60, 62 will be connected to the other servo piston means to effect decreased pump displacement upon fluid flow therethrough. The fluid flow from inlet passageway 32 is directed into a chamber 19 disposed in the bore 14 between lands 18 and 20. The fluid flow from chamber 19 through passageway 60 is controlled by the land 20 of valve member 16. The fluid flow from inlet passageway 34 is directed into a chamber 23 disposed in bore 14 between lands 22 and 24. The fluid flow from chamber 23 through passageway 62 is controlled by the land 22 of valve member 16.

The spool valve member 16 is illustrated in its neutral position in which passageways 60 and 62 are blocked. When the valve member 16 moves toward the left due to movement of the flapper 50 to block passageway 48 and open passageway 46, fluid flow through passageway 60 will be blocked by land 20 and fluid flow through passageway 62 will commence as land 22 moves toward the left to unblock fluid passageway 62. Fluid flow through passageway 62 will actuate the servo piston means of the hydrostatic transmission to effect movement of the swashplate in a first direction to increase pump displacement. When the flapper 50 is moved toward the right, the pressure increase in chamber 26 and the pressure decrease in chamber 28 will effect movement of the spool valve member 16 toward the right. Movement of the spool valve member 16 toward the right from its neutral position illustrated in the FIGURE allows land 20 to unblock fluid passageway 60 to effect movement of the swashplate of the pump in a second direction to decrease the displacement of the fluid pump. Movement of the spool valve member 16 to the right will cause land 22 to continue to block fluid flow through passageway 62.

A viscosity sensitive restriction 64 is disposed in passageway 36 intermediate the inlet portion 30 and the passageway portions 38, 40 and 42. The viscosity sensitive restriction 64 allows the pilot pressure in chambers 26 and 28 to rise at a rate which will not allow the upstream orifices to reach flow saturation. Therefore, the flow of control fluid into one chamber 26 may be greater than into the other chamber 28 while still maintaining equal pressures between the chambers 26 and 28.

In the preferred embodiment the viscosity sensitive restriction 64 is formed by a threaded member 66 which is located in passageway 36. The threaded member 66 cooperates with cylindrical passageway 36 to define a spiral triangular shaped passageway between the threaded member 66 and the cylindrical inner surface of passageway 36 through which the control fluid must pass when flowing to chambers 26 and 28. The spiral triangular shaped passageway has a relatively small diameter and a relatively long length. The utilization of a spiral passageway enables the viscosity sensitive restriction 64 to have a long length compressed into a relatively short space in passageway 36 due to the spiral configuration of the passageway. In order for the viscosity sensitive restriction to be effective, it is necessary that the length of the passageway be much greater than the cross sectional area. Other configurations of velocity sensitive restrictions could be utilized in the present embodiment. For example, instead of utilizing a spiral, triangular shaped flow path for the viscosity sensitive restriction, the viscosity sensitive passageway could be a straight passageway having a small diameter and a long length to accomplish the same results. Moreover, the fluid flow through the viscosity sensitive restriction must be laminar and have a Reynolds number of less than 2,000 in order for the viscosity sensitive restriction to be viscosity sensitive. This is accomplished by utilizing a relatively long passageway having a relatively small crosssectional area. In the preferred triangular spiral shaped embodiment, the viscosity sensitive passageway has a length of approximately 6.9 inches and has a crosssectional area of approximately 0.0057 inches.

Utilization of a viscosity sensitive restriction 64 eliminates transients in the pressurized control fluid supplied to chambers 26 and 28 when the control fluid has high viscosity. Pressure transients is a typical problem in cold start applications at low temperatures where the control fluid has a high viscosity. If the viscosity sensitive restriction was not present during cold start, unequal pressures would be established in fluid chambers 26 and 28 due to the non symmetrical configuration of chambers 26 and 28 and passageways 38, 40, 42, 46 and 48. The unequal pressure in chambers 26 and 28 would cause the spool valve member 16 to move from its neutral position and direct control fluid to the servo pistons to vary the angle of the swashplate. Upon initial pressurization of control valve 10, it is important for the valve member 16 to remain in its neutral position to prevent actuation of the servo piston means with the control commanded to neutral prior to the valve 10 being fully pressurized. If valve member 16 moves prior to full pressurization of the valve 10, due to transients in the fluid pressure in chambers 26, 28 and not in response to the flapper control 44, the movement of the valve member 16 will not be a controlled movement if transients in the fluid pressure in chambers 26, 28 are present. The transients will stroke valve 16 and thus cause the swashplate of the pump to move from its neutral position prior to the time that the swashplate can be accurately controlled by valve 10 and flapper 44. The viscosity sensitive restriction prevents stroking of valve member 16 by transient fluid pressures in chambers 26, 28 prior to full pressurization of valve 10 by maintaining substantially equal pressures in chambers 26, 28 upon initial pressurization thereof. Subsequent to full pressurization of valve 10, flapper 44 will be operable to accurately control the position of the spool member 16 and the angle of the swashplate in accordance with a control signal directed to the torque motor 50. Moreover, the viscosity sensitive restriction eliminates the need for symmetrical fluid flow paths to and from the chambers 26 and 28 which is necessary if a viscosity sensitive restriction is not provided. This decreases the cost of the valve. The viscosity sensitive restriction insures low pilot valve pressure gain during initial startup at a time when the spool position time lag is the greatest. This is important because the lag is destabilizing and the low gain is stabilizing and serves to maintain servo stability within the system. Without the reduced gain, the system will exhibit a severe oscillatory instability.

It should be apparent that the viscosity sensitive restriction 64 eliminates the need for symmetrical fluid passageways to and from the chambers 26 and 28. As is illustrated in the FIGURE, the fluid passageways 40, 42 to chamber 26 and the fluid passageway 46 from chamber 26 has a much greater volume than the fluid passageway 38 to chamber 28 and the fluid passageway 48 from chamber 28. Moreover, it is possible that the volume of the chambers 26 and 28 could be unequal. In this case, the viscosity sensitive restriction 64 will still maintain equal pressure build up in the chambers 26 and 28 upon initial pressurization thereof regardless of the viscosity of the control fluid. The colder the temperature and hence the greater viscosity of the control fluid, the lower the flow saturation of the upstream chambers and the greater the pressure drop across the viscosity sensitive restriction 66. It should be appreciated that the viscosity sensitive restriction could, if desired, be utilized to control the fluid flow from passageways 32 and 34 into chambers 19 and 23 if chambers 19 and 23 were of unequal volume and the restriction was required to eliminate pressure transients therein.

From the foregoing it should be apparent that a new control valve assembly for controlling a hydrostatic transmission has been provided. The control valve includes a valve body, first and second chambers disposed in the valve body, a first fluid passageway disposed in the valve body for directing pressurized control fluid to the first and second chambers and a valve member located in the valve body for controlling the flow of pressurized control fluid to the servo means of the hydrostatic transmission to control the displacement of the pump. The pressurized fluid in the first chamber acts on the valve member to bias the valve member in a first direction and the pressurized fluid in the second chamber acts on the valve member to bias the valve member in a second direction opposite the first direction. A viscosity sensitive restriction is disposed in the first fluid passageway and the control fluid is directed therethrough to the first and second fluid chambers. The viscosity sensitive restriction maintains substantially equal pressures in the first and second chambers upon initial pressurization thereof.

What we claim is:

1. A control valve assembly for controlling a hydrostatic transmission including a fluid pump having a variable swashplate, a source of control fluid under pressure and servo means responsive to the control fluid for varying the swashplate of the fluid pump, said control valve comprising a valve body, first and second fluid chambers disposed in said valve body, first fluid passageway means disposed in said valve body for directing pressurized control fluid to said first and second fluid chambers, a valve member located in said valve body for controlling the flow of pressurized control fluid to the servo means to control the position of the swashplate, said pressurized fluid in said first fluid chamber acting on said valve member to bias said valve member in a first direction, said pressurized fluid in said second fluid chamber acting on said valve member to bias said valve member in a second direction opposite said first direction and a viscosity sensitive restriction disposed in said first fluid passageway and through which said control fluid is directed to said first and second fluid chambers, said viscosity sensitive restriction maintaining substantially equal pressures in said first and second chambers upon initial pressurization thereof.

2. A control valve assembly for controlling a hydrostatic transmission as defined in claim 1 further including second fluid passageway means for directing fluid flow from said first chamber, third fluid passageway means for directing fluid flow from said second chamber and control means for controlling the fluid flow through said second and third fluid passageway to control the fluid pressure in said first and second chambers acting on said valve member.

3. A control valve assembly as defined in claim 2 wherein said control means is operable to close said second fluid passageway and open said third fluid passageway to increase the fluid pressure in said first fluid chamber and decrease the fluid pressure in said second fluid chamber to move said valve member in said first direction and is operable to open said second fluid passageway and close said third fluid passageway to increase the fluid pressure in said second fluid chamber and decrease the fluid pressure in said first fluid chamber to move said valve member in said second direction.

4. A control valve assembly for controlling a hydrostatic transmission as defined in claims 2 or 3 wherein said viscosity sensitive restriction includes a threaded member located in said first fluid passageway means and defining a viscosity sensitive path around which said control fluid must pass.

5. A control valve assembly for controlling a hydrostatic transmission as defined in claim 3 wherein the fluid flow through said viscosity sensitive restriction is laminar and has a Reynold's number of less than two thousand.

6. A control valve assembly for controlling a hydrostatic transmission as defined in claim 3 wherein said control means includes a flapper valve for opening and closing said second and third passageway means, a torque motor for controlling the position of said flapper valve, means for generating a control signal and directing said control signal to said torque motor to control the position of said flapper valve in dependence upon said control signal and feedback means to bias said flapper valve in dependence upon the angular position of the swashplate of the fluid pump.

7. A control valve assembly for controlling a hydrostatic transmission as defined in claim 2 further including fourth and fifth fluid passageway means disposed in said valve body for directing the flow of control fluid to the servo means to vary the swashplate of the fluid pump, said valve member having a neutral position blocking the flow of control fluid through said fourth and fifth fluid passageway means, said valve member when moved from said neutral position in said first direction acting to open one of said fourth and fifth passageways and block the other of said fourth and fifth passageways to vary the angle of the swashplate to increase the displacement of the fluid pump, said valve member when moved from said neutral position in said second direction acting to open said other of said fourth and fifth passageways and block said one of said fourth and fifth passageways to vary the angle of the swashplate to decrease the displacement of the fluid pump.

8. A control valve assembly for controlling a hydrostatic transmission as defined in claim 1 wherein the volume of said first fluid chamber is not equal to the volume of said second fluid chamber.

9. A control valve assembly for controlling a hydrostatic transmission as defined in claim 1 wherein the combined volumes of said first fluid chamber, said second fluid passageway means and that portion of said first fluid passageway means, between said viscosity sensitive restriction and said first fluid chamber is not equal to the combined volume of said second fluid chamber, said third fluid passageway means and that portion of said first fluid passageway means between said viscosity sensitive restriction and said second fluid chamber.

10. A control valve for controlling a flow of control fluid comprising a valve body, first and second fluid chambers disposed in said valve body, first fluid passageway means disposed in said valve body for directing pressurized control fluid to said first and second fluid chambers, a valve member located in said valve body for controlling the flow of pressurized control fluid from the valve body, said pressurized fluid in said first fluid chamber biasing said valve member in a first direction, said pressurized fluid in said second fluid chamber biasing said valve member in a second direction opposite said first direction and a viscosity sensitive restriction disposed in said first fluid passageway and through which said control fluid is directed to said first and second fluid chambers, said viscosity sensitive restriction maintaining substantially equal pressure in said first and second chambers upon initial pressurization thereof.

11. A control valve for controlling the flow of control fluid as defined in claim 10, further including second fluid passageway means disposed in said valve member for directing the flow of control fluid from said valve body, said valve member controlling the fluid flow through said second fluid passageway means.

12. A control valve for controlling the flow of control fluid as defined in claim 10, further including second and third fluid passageways disposed in said valve body for directing the flow of control fluid from said valve body, said valve member controlling the fluid flow through said second and third fluid passageways.

13. A control valve for controlling the flow of control fluid as defined in claim 12 wherein said valve member has a neutral position to which said valve member is biased by the fluid pressure in said first and second fluid chambers when the fluid pressure in said first and second chambers is substantially equal and said viscosity sensitive restriction maintains substantially equal pressure in said first and second chambers upon initial pressurization thereof to prevent movement of said valve member from said neutral position.

14. A control valve for controlling the flow of control fluid as defined in claim 13 wherein said valve member when in said neutral position blocks fluid flow from said valve body through said second and third fluid passageways, said valve member when biased in said first direction from said neutral position by said pressurized fluid in said first chamber acting to open one of said second and third fluid passageways and block the other of said second and third fluid passageways and said valve member when biased in said second direction from said neutral position by said pressurized fluid in said second fluid chamber acting to open said other of said second and third fluid passageways and block said one of said second and third fluid passageways.

15. A control valve for controlling the flow of control fluid as defined in claim 14 wherein said viscosity sensitive restriction includes a threaded member located in said first fluid passageway and defining a viscosity sensitive passageway through which said control fluid must pass.

16. A control valve for controlling the flow of control fluid as defined in claim 15 wherein the fluid flow through said viscosity sensitive passageway is laminar and has a Reynolds number of less than two thousand.

17. A control valve for controlling the flow of control fluid as defined in claim 16 wherein the volume of said first fluid chamber is not equal to the volume of said second fluid chamber.

18. A control valve for controlling the flow of control fluid as defined in claim 16, wherein the combined volumes of said first chamber and that portion of said first fluid passageway between said viscosity sensitive restriction and said first chamber is not equal to the combined volumes of said second chamber and that portion of said first fluid passageway means between said viscosity sensitive restriction and said second chamber.

19. A control valve for controlling the flow of control fluid as defined in claim 12 wherein the combined volumes of said first chamber and that portion of said first fluid passageway means between said viscosity sensitive restriction and said first chamber is not equal to the combined volume of said second chamber and that portion of said first fluid passageway means between said viscosity sensitive restriction and said second chamber.

20. A control valve for controlling the flow of control fluid as defined in claim 10 wherein said valve member has a neutral position to which the valve member is biased by the fluid pressure in said first and second fluid chambers when the fluid pressure in said first and second chambers is substantially equal and said viscosity sensitive restriction maintains substantially equal pressure in said first and second chambers upon initial pressurization thereof to prevent movement of said valve member from said neutral position.

21. A control valve for controlling the flow of control fluid as defined in claim 10 wherein said viscosity sensitive restriction includes a threaded member located in said first fluid passageway and defining a viscosity sensitive passageway through which said control fluid must pass.

22. A control valve for controlling the flow of control fluid as defined in claim 21 wherein the fluid flow through said viscosity sensitive passageway is laminar and has a Reynolds number of less than two thousand.

23. A spool valve for controlling a flow of control fluid comprising a valve body, a bore disposed in said valve body, a spool valve member having first and second lands thereon disposed in said bore, a first fluid chamber defined by said first land and said bore, a second fluid chamber defined by said second land and said bore, a first fluid passageway means disposed in said valve body for directing a pressurized control fluid to said first and second fluid chambers, second fluid passageway means for directing the control fluid from said valve body, said spool valve member controlling the fluid flow through said second fluid passageway means and having a neutral position for blocking said second fluid passageway means, said pressurized fluid in said first chamber biasing said spool valve member in a first direction and said pressurized fluid in said second chamber biasing said spool valve member in a second direction opposite said first direction, and a viscosity sensitive restriction disposed in said first fluid passageway means and through which fluid is directed to said first and second fluid chambers, said viscosity sensitive restriction maintaining substantially equal pressure in said first and second fluid chambers to prevent movement of said spool valve member from said neutral position upon initial pressurization of said first and second fluid chambers.

24. A spool valve as defined in claim 23 wherein the fluid flow through said viscosity sensitive restriction is laminar and has a Reynolds number of less than two thousand.

25. A spool valve as defined in claim 24 wherein said viscosity sensitive restriction includes a threaded member located in said first fluid passageway means and defining a viscosity sensitive passageway through which said control fluid must pass.

26. A spool valve as defined in claim 25 wherein said second fluid passageway means includes second and third fluid passageways for directing the control fluid from said valve body, said spool member further including third and fourth lands thereon, said third land and said fourth land, respectively, blocking said second and third fluid passageways when said spool valve member is in said neutral position, said spool valve when biased in said first direction from said neutral position by said pressurized fluid in said first chamber acting to open said second fluid passageway and block said third fluid passageway and said spool member when biased in said second direction from said neutral position by said pressurized fluid in said second chamber acting to open said third fluid passageway and block said second fluid passageway.

27. A spool valve as defined in claim 26 further including a fourth fluid passageway disposed in said valve body for directing control fluid from said first fluid chamber, a fifth fluid passageway disposed in said valve body for directing control fluid from said second fluid chamber, and control means for controlling the fluid flow through said fourth and fifth fluid passageways to control the fluid pressure acting on said spool valve member subsequent to the initial pressurization of said first and second fluid chambers through said first fluid passageway means.

* * * * *